(12) United States Patent
Whitley

(10) Patent No.: US 9,527,337 B2
(45) Date of Patent: Dec. 27, 2016

(54) REGISTERED IMAGED FABRIC TRANSFER

(71) Applicant: Stahls' SCS, St. Clair Shores, MI (US)

(72) Inventor: Bill Whitley, South Lyon, MI (US)

(73) Assignee: Stahls' Inc., St. Clair Shores, MI (US)

( * ) Notice: Subject to any disclaimer, the term of this patent is extended or adjusted under 35 U.S.C. 154(b) by 0 days.

(21) Appl. No.: 14/159,230

(22) Filed: Jan. 20, 2014

(65) Prior Publication Data

US 2014/0202614 A1    Jul. 24, 2014

Related U.S. Application Data

(60) Provisional application No. 61/754,428, filed on Jan. 18, 2013.

(51) Int. Cl.
| | |
|---|---|
| *B44C 1/16* | (2006.01) |
| *D06Q 1/00* | (2006.01) |
| *D06Q 1/10* | (2006.01) |
| *B32B 38/00* | (2006.01) |

(52) U.S. Cl.
CPC ............ *B44C 1/16* (2013.01); *B32B 38/0004* (2013.01); *D06Q 1/00* (2013.01); *D06Q 1/10* (2013.01); *Y10T 156/1052* (2015.01)

(58) Field of Classification Search
CPC ......... B44C 1/16; B32B 38/0004; D06Q 1/00; Y10T 156/1052
USPC ........................................ 156/250, 252, 253
See application file for complete search history.

(56) References Cited

U.S. PATENT DOCUMENTS

| | | | |
|---|---|---|---|
| 5,878,681 A * | 3/1999 | Asami ...................... 112/475.18 |
| 6,613,412 B1 * | 9/2003 | Dressler ...................... 428/41.8 |
| 2010/0178445 A1* | 7/2010 | Shen et al. ................... 428/40.1 |
| 2011/0008618 A1* | 1/2011 | Weedlun ................. B44C 1/105 |
| | | | 428/343 |

* cited by examiner

*Primary Examiner* — Philip Tucker
*Assistant Examiner* — Christopher C Caillouet
(74) *Attorney, Agent, or Firm* — Fishman Stewart PLLC

(57) ABSTRACT

Exemplary methods of making an applique are disclosed. An exemplary method includes forming a graphic and at least one registration mark on a display side of a fabric layer. An adhesive may be applied to a non-display side of the fabric layer, and a backing carrier may be applied to the adhesive. The methods may further include cutting through the fabric layer and the adhesive, but not the backing carrier, using a cutting tool that is responsive to the at least one registration mark. Exemplary methods may also include applying a topside carrier to the display side of the fabric layer. A bond between the topside carrier and the fabric layer may be stronger than a bond between the backing carrier and the fabric layer.

20 Claims, 4 Drawing Sheets

REGISTERED IMAGED FABRIC TRANSFER

CROSS-REFERENCE TO RELATED APPLICATIONS

This application claims priority to U.S. Provisional Patent Application No. 61/754,428 filed Jan. 18, 2013, the contents of which is hereby incorporated in its entirety.

BACKGROUND

Printed fabric patches are known for being used to decorate garments. A layer of fabric used in this way is commonly called an "appliqué" and is typically used for decorative purposes. Traditionally, appliques consisting of multiple pieces usually requires the decorator to layout multiple pieces of fabric to form the applique, which requires time and labor. Moreover, known approaches for laying out multiple fabric pieces of an applique are subject to tolerances or error resulting from the individual positioning of each of the separate fabric pieces, resulting in fabric pieces that are misaligned from one another.

Accordingly, there is a need for an applique having multiple fabric pieces and method of making the same that reduces setup time and costs while ensuring more precise placement of graphical regions and/or fabric pieces.

BRIEF DESCRIPTION OF THE DRAWINGS

While the claims are not limited to the illustrated examples, an appreciation of various aspects is best gained through a discussion of various examples thereof. Referring now to the drawings, exemplary illustrations are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations are described in detail by referring to the drawings as follows.

DESCRIPTION

Exemplary illustrations are provided herein of an applique for applying to a garment, and methods of making the same. An exemplary method may include forming a graphic and at least one registration mark on a display side of a fabric layer. An adhesive may be applied to a non-display side of the fabric layer, and a backing carrier may be applied to the adhesive. The methods may further include cutting through the fabric layer and the adhesive, but not the backing carrier, using a cutting tool that is responsive to the at least one registration mark. Exemplary methods may also include applying a topside carrier to the display side of the fabric layer. A bond between the topside carrier and the fabric layer may be stronger than a bond between the backing carrier and the fabric layer.

In some exemplary illustrations, a predetermined spacing may be defined between at least two separate fabric pieces, e.g., as formed in the cutting of the fabric layer. The predetermined spacing of the separate fabric pieces may be maintained after the cutting of the fabric layer by supporting the at least two separate fabric pieces on the backing carrier.

Figure 1:
FIG. 1 is an exemplary garment having an applique applied thereon, according to one exemplary illustration.

Turning now to FIG. 1, an exemplary garment 100 is illustrated having an applique 200. The applique 200 is generally comprised of multiple pieces of fabric formed from a single piece of a fabric layer. The applique 200 comprises individual pieces 202*a*, 202*b*, 202*c*, 202*d*, 202*e*, 202*f* (collectively, 202), each having a graphic 204 on a display side the pieces 202. As will be described further below, the pieces 202 are adhered to the garment 100 in a pre-determined spacing or relative position to each other, and may be placed on the garment 100 by using a carrier (not shown in FIG. 1) in registration which allow for placement of all the pieces 202 at once. The pieces 202 may define any shape or configuration convenient, e.g., letters, numbers, symbols, or shapes.

Figure 2:
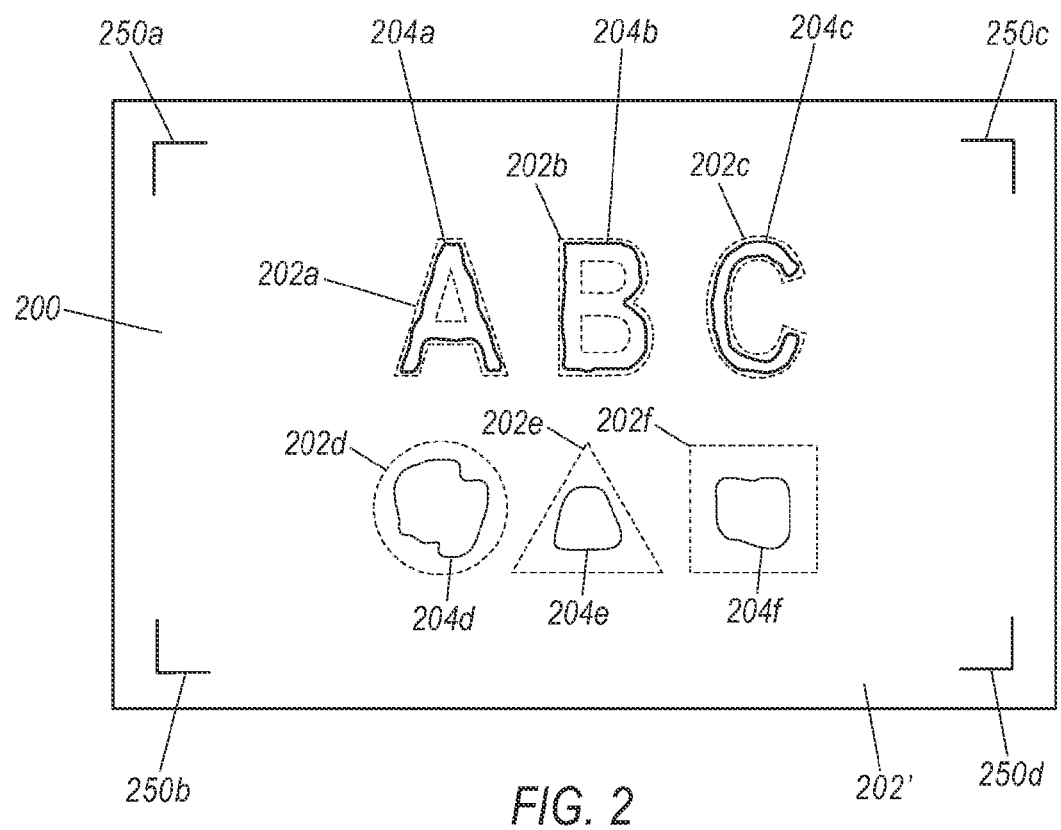
FIG. 2 is an exemplary applique shown prior to cutting, and having exemplary graphics previously printed or applied to the applique.

Turning now to FIG. 2, an exemplary single layer of fabric 202' may be imaged or provided with a graphic on a display side of the fabric 202' using any process that is convenient. In one exemplary illustration, the fabric 202' may be imaged using an imaging process such as sublimation. The fabric 202' may be imaged with graphics or text that contain separate regions of artwork. In other words, the fabric 202' has a plurality of graphics or images 204*a*, 204*b*, 204*c*, 204*d*, 204*e*, and 204*f* (collectively, 204) which are positioned to correspond to the eventual cutting of the fabric 202' to create the plurality of fabric pieces 202*a*, 202*b*, 202*c*, 202*d*, 202*e*, and 202*f*.

Figure 3:
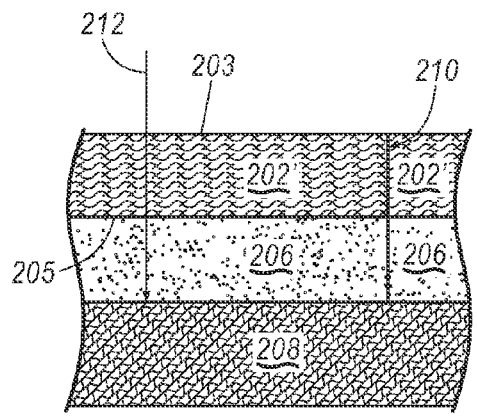
FIG. 3 is a cross-sectional view of a fabric layer of an applique having an adhesive layer and a carrier layer applied to a side of the fabric layer opposite a display side, and illustrating a series of cuts being made through the fabric and adhesive layers.

The fabric layer 202' may be constructed in such a way to have a heat transfer adhesive on the side opposite to the printing. For example, a polyester heat activated adhesive may be applied on a side of the fabric layer 202' opposite the graphics 204. As best seen in FIG. 3, a layer of an adhesive 206 may be applied to a reverse side 205 of the fabric layer 202' that is opposite a display side 203 of the fabric layer 202'. Additionally, the adhesive 206 may have a backing carrier 208 such as, but not limited to, a coated paper material. In some examples, the carrier 208 and adhesive 206 may be applied to the non-display side 205 of the fabric layer 202' in a single step. For example, the adhesive 206 and carrier 208 may be initially applied together, and then subsequently applied to the fabric layer 202' together.

In some exemplary illustrations, the adhesive layer 206 and carrier 208 may be applied to the fabric layer 202' prior to application of any graphics 204 on the fabric layer 202'. For example, the fabric layer 202', adhesive layer 206, and carrier 208 may be formed in a layered sheet that may be printed upon, e.g., using an inkjet printer, sublimation process, or any other process for forming graphics 204 on the fabric layer 202' that is convenient.

After printing the graphics 204 on the display side 203 of the fabric layer 202', the graphical elements 202 may be cut out through use of one or more printed registration marks 250a, 250b, 250c, 250d (collectively, 250), as best seen in FIG. 2. The registration marks 250 may be positioned on a waste portion of the fabric layer 202' such that they do not blemish the formed fabric pieces 202. In other words, the registration marks 250 may be positioned on the fabric layer 202' away from the eventually formed fabric pieces 202.

Exemplary cutting processes include, but are not limited to laser cutting. In another example, a blade may be used to cut the fabric layer 202'. The fabric layer 202' may thus be "kiss-cut" such that the fabric layer 202' adhesive 206 are cut, but the carrier 208 is not. For example, as shown in FIG. 3, the fabric layer 202' and adhesive layer 206 have a first cut 210 extending through both layers but not extending through the carrier 208. While the cut 210 may extend into a portion of the carrier 208, in any case the carrier 208 remains sufficiently intact that it supports each of the plurality of fabric pieces 202 after the cutting process is completed. Accordingly, a predetermined spacing or positioning of the fabric pieces 202 with respect to each other is maintained by the backing carrier 208 even after the fabric layer 202' is cut.

A second cut 212 may be positioned relative to the first cut 210 with reference to one or more of the registration marks 250. The registration marks 250 (see FIG. 2) may each be positioned in a waste portion of the fabric layer 202' to facilitate printing of the graphics 204 and/or cutting of the fabric pieces 202 by providing reference positions for a printer and cutting machine, respectively. Accordingly, the fabric pieces 202 are each precisely positioned relative to one another on the carrier 208 after the cutting process is completed.

Figure 4:
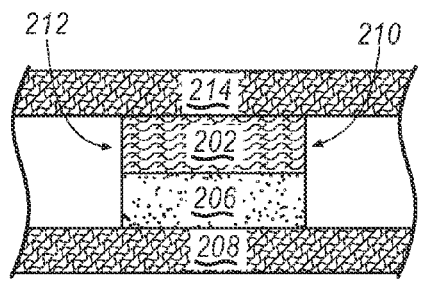
FIG. 4 is a cross-sectional view of the fabric/adhesive/carrier layers from FIG. 3 after the cutting process is completed, and having a pressure-sensitive carrier layer applied over the display side of the fabric layer.

Turning now to FIG. 4, a second carrier 214 may be applied to the printed side of the fabric by means such as, but not limited to a pressure sensitive adhesive. In one exemplary illustration, the front carrier 214 is a masking tape or other non-permanent carrier that is selectively removable from the display side 203 of the fabric layer 202'. Moreover, the front carrier 214 may advantageously be removable from the fabric pieces 202 such that it does not damage any graphics 204 (not shown in FIG. 4) on the display side 203 of the fabric pieces 202. Nevertheless, the printed side carrier 214 may form a bond with the fabric pieces 202 that is substantially stronger than that of the bond between the heat transfer adhesive 206 and backside carrier 208. This difference in bond strength may advantageously facilitate removal of the backside carrier 208 while allowing the front carrier 214 to remain engaged with the fabric pieces 202. In this manner, a relative position or spacing of the fabric pieces 202 with respect to each other is maintained after the backside carrier 208 is removed.

Figure 5:
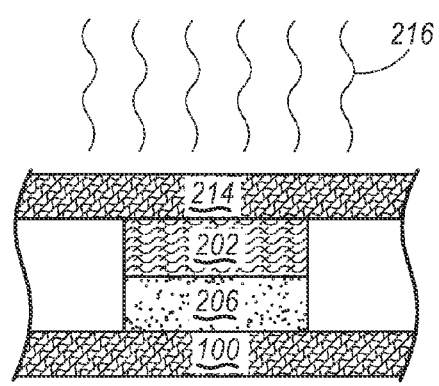
FIG. 5 is a cross-sectional view of the display-side carrier and fabric/adhesive layers from FIG. 4 with the rear-side carrier layer removed and the fabric/adhesive positioned on a garment for applying thereon, e.g., using an exemplary heat application process.

Turning now to FIG. 5, the backside carrier 208 has been removed and discarded, leaving desired portions of imaged fabric on carrier. Additionally, excess or waste portions of the fabric layer 202' has been weeded away or removed, leaving only the fabric pieces 202 to form the applique. The exposed adhesive 206 may then be applied to a garment 100. As noted above, the adhesive 206 may be a heat-activated adhesive which responds to heat 216 which may be applied to a front side of the adhesive 206 (i.e., through the front carrier 214 and fabric piece 202), and/or to a rear side of the adhesive 206 (i.e., through the garment 100).

Figure 6:
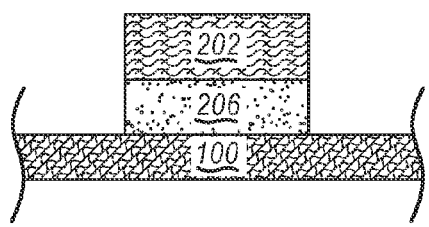
FIG. 6 is a cross-sectional view of the fabric/adhesive layers from FIG. 5, after the application to the garment is complete.

Turning now to FIG. 6, the resulting applique 200 is illustrated on the garment 100. The applique 200 provides a registered imaged applique 200 using multiple pieces 202 formed from the fabric layer 202', thereby reducing time and labor required to set up garments for decoration. The registered applique 200 may reduce errors in placement of the separate fabric pieces 200, reducing total production cost and number of wasted garments. The exemplary appliques and methods of applying the same also reduce or eliminate any need to combine graphical elements in larger fabric pieces, leading to an overall lighter weight of the applique 200 on the garment 100, and allows production of an applique 200 which more closely represents artistic intent. Additionally, customers are not limited by any number of regions within their artwork, and may thus accurately position separate pieces of fabric 202 on a garment 100 despite a large number of pieces 202 or very small size of the pieces 202.

Figure 7:
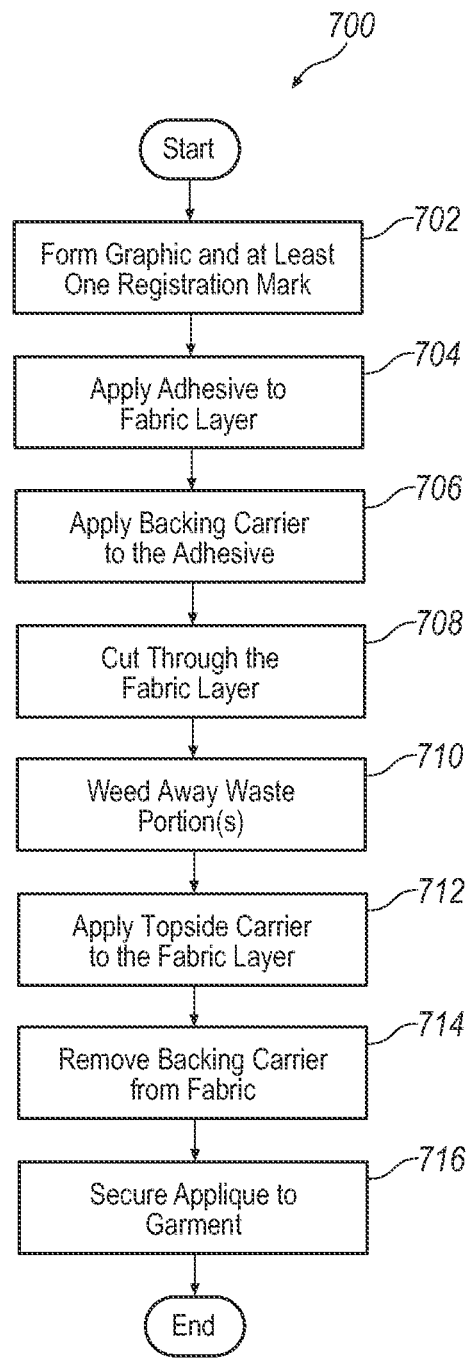
FIG. 7 illustrates a process flow diagram of an exemplary process for making an applique, e.g., for applying to a garment.

Turning now to FIG. 7, an exemplary process 700 for making an applique, e.g., for applying to a garment, is described in further detail. Process 700 may begin at block 702. At block 702, a graphic may be formed, along with at least one registration mark on a display side of a fabric layer. For example, as described above, a plurality of registration marks 250 may be formed on a display side 203 of a fabric layer 202'. The fabric layer 202' may be provided in a single layer. The one or more graphics 204 may also be printed. In one exemplary illustration, a single layer of fabric, such as a polyester twill, is printed with desired graphics 204 and registration marks 250 (see FIG. 2). However, any other fabrics may be used that are convenient. Exemplary fabrics may include, but are not limited to, polyester, cotton, nylon, or spandex. Moreover, exemplary fabrics may include woven, knit, or other fabrics. In another exemplary illustration, the graphics 204 may be engaged onto the display side 203 of the fabric layer 202' using inkjet printing. However, any method of applying a graphic to a fabric layer may be used that is convenient. Merely as examples, other printing methods may be used including, but are not limited to, screen printing or toner printing. Additionally, other exemplary methods of forming a graphic 204 may include transfer sublimation, direct sublimation, solvent application, aqueous application, ultraviolet application, or any other method that is convenient.

Proceeding to block 704, an adhesive may be applied to the fabric layer. For example, as described above an adhesive 206 may be applied generally in a layer to a non-display side 205 of the fabric layer 202'. As noted above, exemplary adhesives 206 may include, but are not limited to, heat transfer adhesives that are configured to secure fabric layers to a garment in response to application of heat. The adhesive 206 may generally be configured to permanently adhere fabric, e.g., fabric pieces 202, to a garment. Exemplary adhesives may include, but are not limited to, a polyester-based heat transfer adhesive. Other exemplary adhesives may include polyurethane or polyamide-based adhesives. In still other exemplary approaches, clear or pigmented adhesives may be used. Exemplary adhesives may be applied using, for example, a heat transfer press or may be applied using other methods such as lamination. Additionally, the adhesive 206 may be applied to fabric layer 202' before or after the graphics tool 204 are applied to the fabric layer 202'. Process 700 may then proceed to block 706.

At block 706, a backing carrier may be applied to the adhesive. For example, as described above a backing carrier 208 may be applied to the adhesive layer 206. Exemplary backing carriers 208 may include a coated release paper.

Alternatively, merely as another example backing carrier 208 can be made of a polyester film. Moreover, the backing carrier 208 may be applied to the fabric 202 along with the adhesive 206. In other words, the backing carrier 208 may be joined with the adhesive 206 initially, and then the backing carrier 208 and adhesive 206 may be secured to the fabric layer 202 together.

As noted above, in some exemplary approaches an adhesive layer 206 and/or backing carrier 208 may be applied to fabric layer 202' prior to forming, e.g., by printing or sublimation, of one or more graphics 204 on the fabric layer 202'. In other examples, graphics 204 may be printed on the fabric layer 202' prior to application of the adhesive layer 206 and/or the backing carrier 208.

Proceeding to block 708, the fabric layer may be cut. For example, as described above, the fabric layer 202' an adhesive 206 may generally be cut using a cutting tool that is responsive to the at least one registration mark 250. Moreover, while the fabric layer 202' and adhesive 206 are cut, the backing carrier 208 generally remains intact. While an exemplary cutting of the fabric layer 202' may cut some small portion of the backing carrier 208, the backing carrier 208 remains substantially intact after completion of the cutting process. Accordingly, the backing carrier 208 may continue to support the multiple fabric pieces 202 after the cutting process is complete. The backing carrier 208 may thereby maintain a desired spacing or positioning of multiple fabric pieces 202 with respect to one another. Exemplary cutting tools may include lasers or mechanical blades, merely as examples. As part of cutting through the fabric layer 202', a cutting path may be determined along the fabric layer 202' depending on the at least one registration mark 250 and a position of at least one printed graphic 204. In other words, the fabric layer 202' may be cut according to how multiple fabric pieces 202 are desired to be laid out to form the applique 200, along with the position of any graphics 204 that are applied to the fabric layer 202'.

The cutting process may thereby form a plurality of separate fabric pieces 202 from the fabric layer 202'. The graphics 204, which had been formed on the display side 203 of the fabric layer 202', may be positioned to correspond to the eventual cutting of the fabric layer 202' that forms the separate fabric pieces 202. Additionally, as noted above, a predetermined spacing may be defined between the multiple fabric pieces 202. This predetermined spacing of the multiple fabric pieces 202 may generally be maintained by the support of the backing carrier 208 after the cutting of the fabric layer 202'.

Proceeding to block 710, waste portions of the fabric layer 202' may be weeded away or removed from the appliqué 200. In other words, excess fabric that is not part of the design of the appliqué 200 may be removed from the backing carrier 208 once the fabric layer 202' is cut to define the multiple fabric pieces 202. Alternatively, as described further below waste portions of the fabric layer 202' may be weeded away after the backside carrier 208 is removed. Process 700 may then proceed to block 712.

At block 712, a topside carrier may be applied to the fabric layer. For example, as described above a topside carrier 214 may be applied to the display side 203 of the fabric pieces 202. A bond strength between the topside carrier 214 and the fabric pieces 202 may be stronger than a bond between the backing carrier 208 and the fabric pieces 202. In another exemplary approach, a polyester film with a pressure sensitive topside carrier may be applied to the fabric layer 202. The topside carrier may be applied by hand or through use of a laminator. In another exemplary approach, the topside carrier 214 may be a paper carrier. In yet another example, the topside carrier 214 may be a heat sensitive adhesive.

Proceeding to block 714, backing carrier may be removed from the fabric layer. For example, as described above the backing carrier 208 may be removed from the fabric pieces 202. The removal of the backing carrier 208 may generally expose the adhesive 206. As noted above, waste portions of the fabric layer 202' may be removed at this point, as an alternative or in addition to any weeding edits performed as described above at block 710. Process 700 may then proceed to block 716.

At block 716, appliqué 200 may be applied to a garment 100. For example, as described above, multiple fabric pieces 202, which form the appliqué 200 may be laid upon a garment 100. The front side carrier to 14 generally maintains and supports a predetermined spacing of the multiple fabric pieces 202. The adhesive 206 may be activated or otherwise be applied such that the fabric pieces 202 are generally permanently applied to the garment 100. Process 700 may then terminate.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A method of producing an appliqué, comprising:
   printing a graphic and at least one registration mark on a display side of a fabric layer;

applying an adhesive to a non-display side of the fabric layer;

applying a backing carrier to the adhesive;

cutting through the fabric layer and the adhesive from the display side, but not the backing carrier, using a cutting tool that is responsive to the at least one registration mark; and applying a topside carrier to the display side of the fabric layer after cutting through the fabric layer and the adhesive, wherein a bond between the topside carrier and the fabric layer is stronger than a bond between the backing carrier and the fabric layer.

2. The method of claim 1, further comprising establishing the at least one registration mark as a plurality of registration marks.

3. The method of claim 1, further comprising establishing the plurality of registration marks as at least three registration marks.

4. The method of claim 1, wherein the fabric layer comprises only a single layer of fabric.

5. The method of claim 1, further comprising weeding away a waste portion of the single layer of fabric.

6. The method of claim 1, further comprising establishing the cutting tool as one of a laser and a mechanical blade.

7. The method of claim 1, wherein the topside carrier is a pressure-sensitive carrier.

8. The method of claim 1, further comprising establishing the adhesive as a heat transfer adhesive configured to secure the fabric layer to a garment in response to application of heat.

9. The method of claim 1, further comprising determining a cutting path along the fabric layer depending at least upon the at least one registration mark and a position of the graphic.

10. The method of claim 1, further comprising applying the adhesive and the backing carrier to the fabric layer together.

11. The method of claim 1, wherein cutting through the fabric layer includes forming at least two separate fabric pieces from the fabric layer.

12. The method of claim 11, further comprising positioning separate graphics formed on the display side of the fabric layer to correspond to the at least two separate fabric pieces.

13. The method of claim 12, further comprising defining a predetermined spacing between the at least two separate fabric pieces; and maintaining the predetermined spacing of the at least two separate fabric pieces after the cutting of the fabric layer by supporting the at least two separate fabric pieces on the backing carrier.

14. A method of producing an appliqué, comprising:

forming a graphic and at least one registration mark on a display side of a fabric layer;

applying an adhesive to a non-display side of the fabric layer;

applying a backing carrier to the adhesive;

cutting through the fabric layer and the adhesive from the display side, but not the backing carrier, using a cutting tool that is responsive to the at least one registration mark, including forming at least two separate fabric pieces from the fabric layer;

defining a predetermined spacing between the at least two separate fabric pieces by the cutting through the fabric layer;

maintaining the predetermined spacing of the at least two separate fabric pieces after the cutting of the fabric layer by supporting the at least two separate fabric pieces on the backing carrier; and applying a topside carrier to the display side of the fabric layer after cutting through the fabric layer and the adhesive, wherein a bond between the topside carrier and the fabric layer is stronger than a bond between the backing carrier and the fabric layer.

15. The method of claim 14, wherein the fabric layer comprises only a single layer of fabric.

16. The method of claim 14, further comprising establishing the adhesive as a heat transfer adhesive configured to secure the fabric layer to a garment in response to application of heat.

17. The method of claim 14, further comprising positioning separate graphics formed on the display side of the fabric layer to correspond to the at least two separate fabric pieces.

18. The method of claim 14, further comprising establishing the at least one registration mark as a plurality of registration marks.

19. The method of claim 14, wherein forming the graphic and the at least one registration mark on the fabric layer includes printing the graphic and the at least one registration mark on the fabric layer.

20. A method of producing an appliqué, comprising:

printing a graphic and a plurality of registration marks on a display side of a fabric layer, the fabric layer comprising only a single layer of fabric;

applying an adhesive to a non-display side of the fabric layer;

applying a backing carrier to the adhesive;

determining a cutting path along the fabric layer depending at least upon the at least one registration mark and a position of at least one printed graphic;

cutting through the fabric layer and the adhesive from the display side, but not the backing carrier, using a cutting tool that is responsive to the at least one registration mark, including forming at least two separate fabric pieces from the fabric layer;

defining a predetermined spacing between the at least two separate fabric pieces by the cutting through the fabric layer;

maintaining the predetermined spacing of the at least two separate fabric pieces after the cutting of the fabric layer by supporting the at least two separate fabric pieces on the backing carrier; and applying a topside carrier to the display side of the fabric layer after cutting through the fabric layer and the adhesive, wherein a bond between the topside carrier and the fabric layer is stronger than a bond between the backing carrier and the fabric layer.

* * * * *